United States Patent
Stauber et al.

(10) Patent No.: US 8,777,221 B2
(45) Date of Patent: Jul. 15, 2014

(54) DEVICE AND METHOD FOR PROCESSING PRINTING PRODUCTS

(75) Inventors: Hans Ulrich Stauber, Grüt (CH); Marcel Ramseier, Wetzikon (CH)

(73) Assignee: Ferag AB

( * ) Notice: Subject to any disclaimer, the term of this patent is extended or adjusted under 35 U.S.C. 154(b) by 208 days.

(21) Appl. No.: 12/792,522

(22) Filed: Jun. 2, 2010

(65) Prior Publication Data

US 2010/0308531 A1 Dec. 9, 2010

(30) Foreign Application Priority Data

Jun. 3, 2009 (CH) .................................... 849/09

(51) Int. Cl.
    *B65H 29/54* (2006.01)
(52) U.S. Cl.
    USPC ........... 271/306; 271/307; 271/314; 271/315; 271/81; 271/82
(58) Field of Classification Search
    USPC .............. 271/306–308, 314, 315, 81–83, 275
    See application file for complete search history.

(56) References Cited

U.S. PATENT DOCUMENTS

| | | |
|---|---|---|
| 3,951,399 A | 4/1976 | Reist |
| 4,116,427 A | 9/1978 | Muller |
| 4,381,056 A | 4/1983 | Eberle |
| 4,723,770 A | 2/1988 | Seidel et al. |
| 4,729,554 A * | 3/1988 | Honegger .................. 270/52.3 |
| 4,743,005 A | 5/1988 | Reist |
| 4,813,662 A * | 3/1989 | Merwarth et al. ............ 271/315 |
| 5,251,888 A | 10/1993 | Eugster |
| 5,395,151 A | 3/1995 | Eberle |
| 5,551,682 A | 9/1996 | Luthi |
| 5,658,422 A | 8/1997 | Boss et al. |

(Continued)

FOREIGN PATENT DOCUMENTS

| | | |
|---|---|---|
| CH | 644 816 | 8/1984 |
| CH | 669 944 | 4/1989 |

(Continued)

OTHER PUBLICATIONS

Search Reported dated Jul. 31, 2009, Swiss Application No. CH2009/00849/09.

(Continued)

*Primary Examiner* — Prasad Gokhale
(74) *Attorney, Agent, or Firm* — Alston & Bird LLP

(57) ABSTRACT

The printing products (24) are supplied to the discharge station (16) by receiving elements (32) of the processing device (12). The discharge station has on the one hand a removal conveyor (18) and on the other hand a clamp transporter (20) arranged downstream with respect to the removal conveyor in the direction of circulation (U) of the receiving elements (32). The gripper tongs (22) of the removal conveyor (18) grip the printing products (24) at the side rim (26) and discharge the printing products from the receiving elements (32). The respectively trailing wall (36) of each receiving element (32) is provided with a guide element (50) which respectively supports the printing product (24) in question and introduces the printing product into an opened clamp (28) of the clamp transporter (20). The clamps (28) grasp the printing products (24) at the edge (30) with which the printing products (24) previously rested against the floor (42) of the receiving elements (32).

18 Claims, 3 Drawing Sheets

(56) References Cited

U.S. PATENT DOCUMENTS

| | | | | |
|---|---|---|---|---|
| 5,722,655 | A | * | 3/1998 | Reist .............................. 271/270 |
| 6,220,591 | B1 | * | 4/2001 | Stauber ......................... 271/225 |
| 6,619,651 | B2 | * | 9/2003 | Mader ............................ 271/82 |
| 6,690,996 | B2 | | 2/2004 | Seiler |
| 6,698,742 | B2 | * | 3/2004 | Hansch ...................... 270/52.22 |
| 6,820,870 | B2 | * | 11/2004 | Eugster ...................... 270/52.25 |
| 7,004,463 | B2 | * | 2/2006 | Eugster et al. ................ 271/187 |
| 7,699,313 | B2 | * | 4/2010 | Sakoguchi ................... 271/315 |
| 2003/0083775 | A1 | * | 5/2003 | Seiler ........................... 700/213 |

FOREIGN PATENT DOCUMENTS

| | | |
|---|---|---|
| DE | 24 47 336 | 4/1975 |
| EP | 0 600 183 | 8/1994 |
| EP | 1 302 418 | 4/2003 |

OTHER PUBLICATIONS

European Patent Office, Extended European Search Report for Application No. 10003931.2, dated Sep. 13, 2013, 3 pages, The Netherlands.

* cited by examiner

DEVICE AND METHOD FOR PROCESSING PRINTING PRODUCTS

FIELD OF THE INVENTION

The present invention relates to a device and a method for processing printing products having the features of the pre-characterizing clause of patent claims 1 and 16 respectively.

BACKGROUND

A device of this type is known from document CH 644 816, for example. It has a cell wheel-like processing device with outwardly open, radial receiving elements. As the receiving elements are rotated about the horizontal axis of rotation, printing products arranged in the receiving elements are transported to a removal conveyor. The removal conveyor has a number of gripper tongs which are arranged, set apart one after another, on a pulling member, the pulling member being guided around a deflection wheel which is axis-parallel to the axis of rotation. During its deflection about the deflection wheel, one gripper tong reaches into a receiving element and grasps the printing product arranged therein at a side rim which is radially external with respect to the axis of rotation. The printing products grasped in this way are discharged from the processing device by the removal conveyor.

A further similar device is known from document CH 669 944. In this case, the processing device also has a number of receiving elements arranged one after another and transversely to the circulation path, the receiving elements being fastened to drive members in the form of chains and the chains being guided about horizontal axes at the upstream and at the downstream end of the processing device.

BRIEF SUMMARY OF THE INVENTION

It is one of the objects of the present invention to provide a device of the type in question and to develop a previously known method that allow the printing products to be discharged from the processing device while being held in different ways at high processing capacity.

This object is achieved by a device and a method respectively having the features of patent claim 1 and the features of patent claim 16 respectively.

Whereas in the known devices and methods the printing products are discharged while being held at that side rim which is positioned radially externally with respect to the axis of rotation, the device according to the invention and the method according to the invention allow the printing products to be discharged while being held at the edge which opposes the side rim and in the receiving elements faces the axis of rotation.

This is particularly advantageous if the side rim is to be freely accessible for further processing. For example, multiply folded printing elements are arranged with their fold radially internally in the receiving elements. They are then grasped by gripper tongs of a removal conveyor at the edge, known as the bloom, opposing the fold and moved out of the receiving elements. In the device according to the invention, the printing products are then grasped by clamps of a clamp transporter at the fold and discharged from the processing device, so that the bloom is then freely accessible.

In a particularly preferred embodiment of the device according to the invention, for processing printing products of differing size—i.e. with a differing distance between the side rim and the edge opposing the side rim—the takeover portion of the removal conveyor is displaced in a direction running at least approximately radially to the axis of rotation of the processing device. In a preferred manner, the position of the clamp transporter remains stationary in this case.

In a further particularly preferred embodiment of the device according to the invention, the trailing wall of each receiving element is provided radially externally with a guide element in order to support in the exposed region the printing product in question which is grasped by a gripper tong and moved out of the receiving element by the gripper tong, so that the edge of said region assumes a defined position in a simple manner for grasping by a clamp.

Further preferred embodiments of the device according to the invention and the method according to the invention are specified in the further dependent patent claims.

BRIEF DESCRIPTION OF THE SEVERAL VIEWS OF THE DRAWINGS

The invention will be described in greater detail based on two exemplary embodiments illustrated in the drawings, in which.

DETAILED DESCRIPTION OF THE INVENTION

Figure 1:
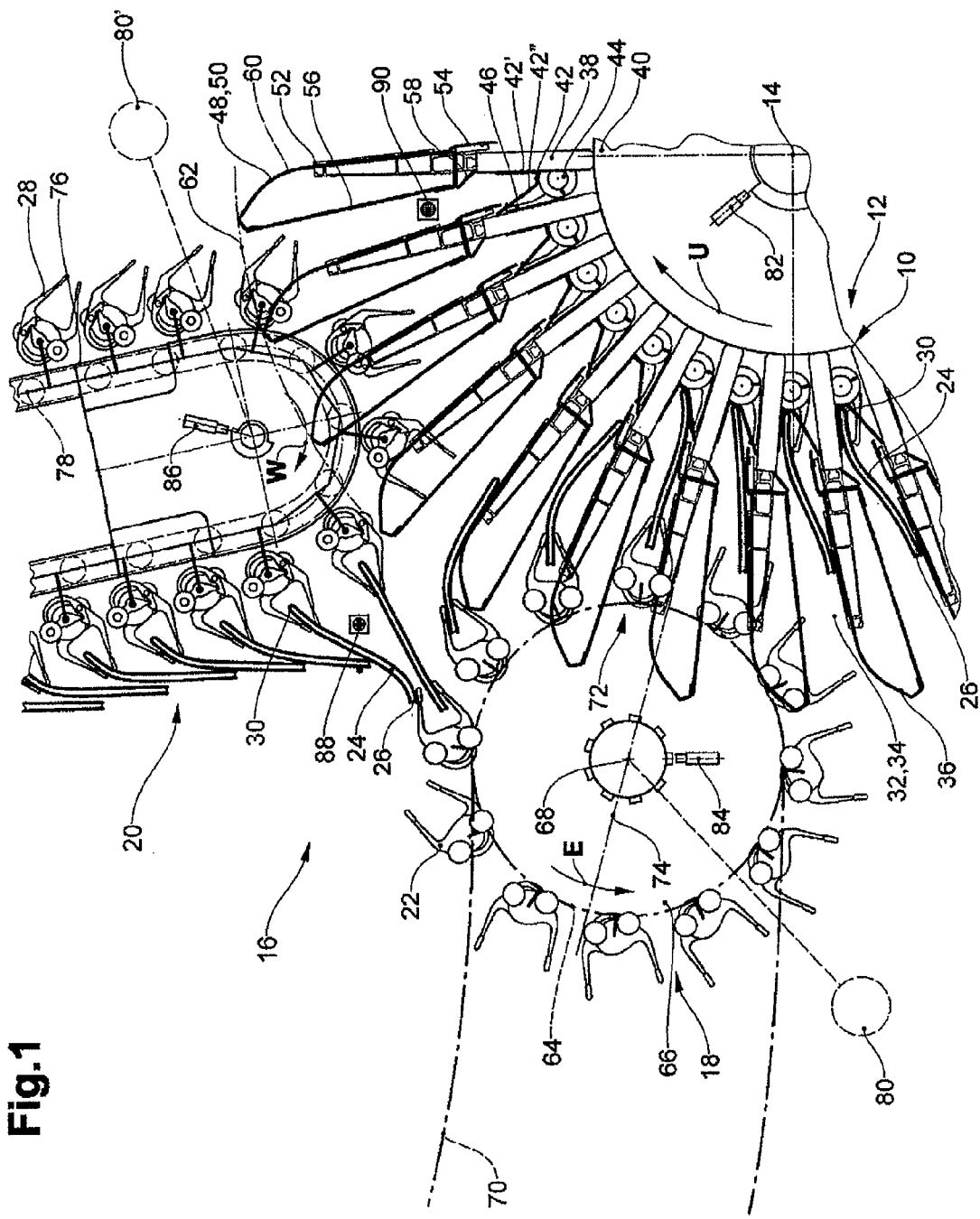
FIG. 1 is a purely schematic view of a part of a device according to the invention with a processing device embodied in the manner of a cell wheel, during processing of small-sized printing products.
Figure 2:
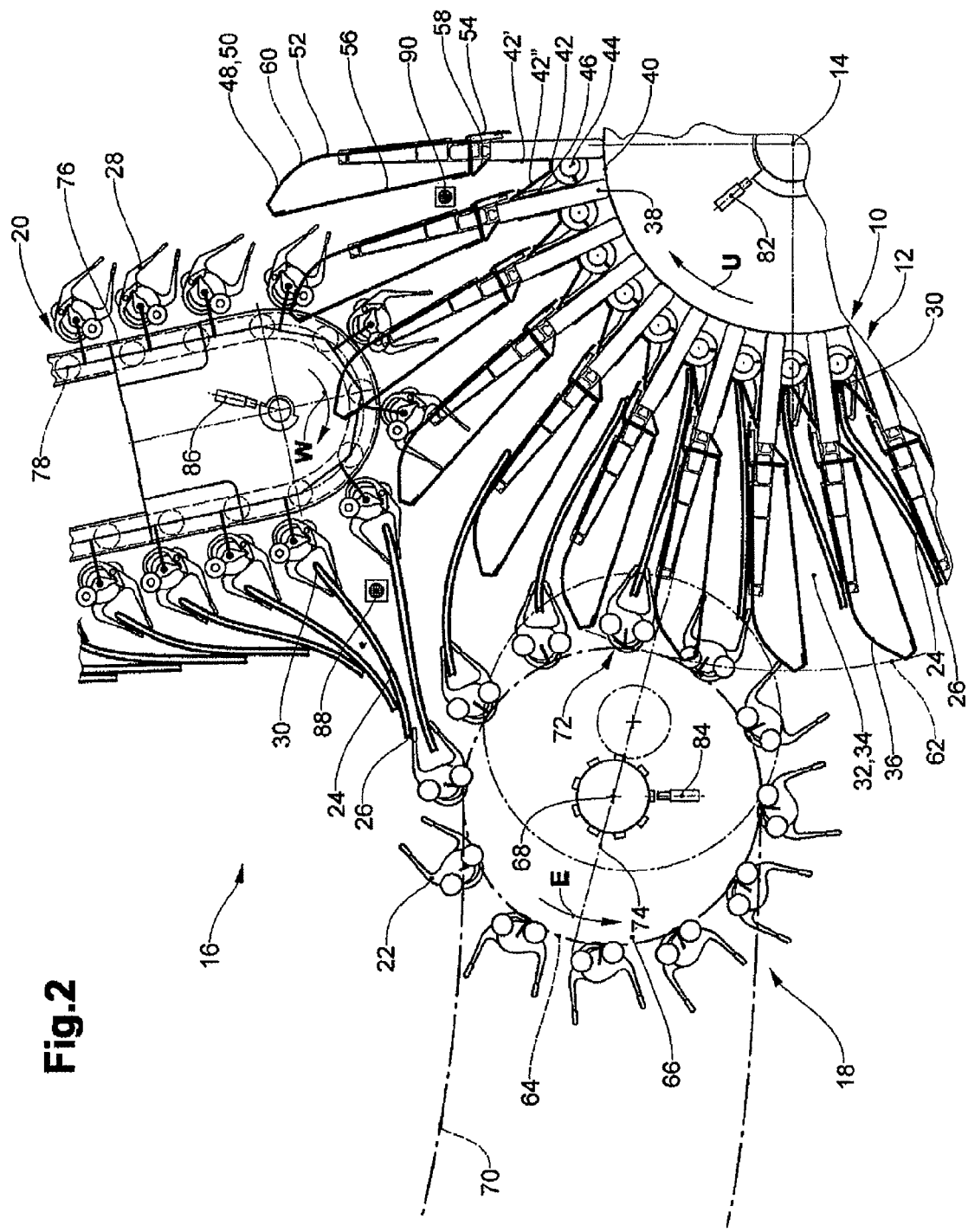
FIG. 2 is a purely schematic illustration, which is the same as that in FIG. 1, of the device shown therein during processing of large-sized printing products.

The embodiment shown in FIGS. 1 and 2 of the device according to the invention has a chamber-like processing device 12 embodied as a cell wheel 10. Only about one quarter of a cell wheel 10, which is driven so as to rotate about the axis of rotation 14 in the direction of circulation U—in this case in the clockwise direction—is shown. Furthermore, the device has a discharge station 16 with a removal conveyor 18 and a clamp transporter 20. The removal conveyor 18 is intended to use its gripper tongs 22 to grasp the printing products 24, which are brought by the cell wheel 10 up to the discharge station 16, at a side rim 26 and to discharge them from the cell wheel 10. The clamp transporter 20 is intended to use its clamps 28 to grasp the printing products 24, which are held by the gripper tongs 22, at their edge 30 opposing the side rim 26 and to discharge them once released by the gripper tongs 22.

The cell wheel 10 is of generally known design and has externally open, radial receiving elements 32 which are embodied as pockets 34 for the printing products 24.

The receiving elements 32 or pockets 34 are each bounded downstream and upstream, viewed in the direction of circulation U, by a wall 36, all the walls being embodied in the same manner and each wall being common to the adjacent receiving element 32. Profile-like carrier elements 38 of the walls 36 are fastened with respect to the axis of rotation 14, at least approximately in the radial direction, to a carrying cylinder 40, which is driven so as to rotate about the axis of rotation 14 in the direction of circulation U, and run in the direction of the axis of rotation 14. Radially internally, each pocket 34 is bounded by a flute-like floor 42 which, in the exemplary embodiment shown, is arranged on the leading carrier element 38 either securely or on a carriage mounted on the carrier element 38. The construction and the mode of operation of cell wheels 10 of this type with carriages, which can be moved back and forth in the direction of the axis of rotation 14, for transporting the printing products 24 to the discharge station 16 are generally known and have already been disclosed in document DE 24 47 336 A, for example.

Each floor 42 has associated with it a clamping device 44 which is for example controlled in a known manner by a connecting link and has a clamping finger 46 which is intended to securely clamp between itself and the interacting side wall 42' of the floor the printing product 24, which is introduced into the receiving element 32 in question, on the one hand during passing through the undershot part of the cell wheel 10 and also if appropriate during the movement of advancement in the direction of the axis of rotation 14.

A wall portion 48, which is arranged outside the floor 42 when viewed in the radial direction, of the wall 36 forms a guide element 50 for the printing products 24 as they are conveyed out of the receiving elements 32, as will be described hereinafter. In the exemplary embodiment shown, the guide elements 50 are formed by surface elements 52, for example from sheet metal, which are fastened to the carrier elements 38 on the leading side in the direction of circulation U and bent, with their portion protruding beyond the carrier elements 38 in the radial direction, counter to the direction of circulation U. Radially internally, these surface elements 52 have an edge portion 54 which overlaps with play the side wall 42", trailing in the direction of circulation U, of the floor 42 in order to ensure that the printing products 24 can securely reach the floor 42 for abutment when the printing elements are introduced into the receiving elements 32, from the radial exterior to the radial interior. Furthermore, each wall portion 48 has a planar covering element 56 which is shaped from sheet metal, for example, is radially externally securely connected to the surface element 52 and runs in a trailing manner with respect to the carrier element 38 in question at a distance in the radial direction inwardly until it is close to the floor 42 in question, where it is fastened to the carrier element 38 by an extension arm-like support member 58. As a result, the side wall 42' of the floor is covered; this, in turn, assists the straightforward introduction of the printing products 24 into the receiving elements 32.

The walls 36 of the cell wheel 10 have, viewed in the direction of the axis of rotation 14, in the discharge station 16 recesses 60 which are outwardly open in the radial direction and allow the gripper tongs 22 on the one hand and the clamps 28 on the other hand to be moved through.

The receiving elements 32 or pockets 34 are thus driven in the direction of circulation U along a circular circulation path 62 which is concentric with the axis of rotation 14 and are arranged one after another and at right angles with respect to this circulation path 62, the receiving elements preferably being inclined slightly toward the rear with respect to the direction of circulation U.

The gripper tongs 22 and clamps 28, which in the exemplary embodiment shown are controlled in the known manner by a connecting link, are preferably identical in their design and can for example be embodied in the manner known from document EP 0 600 183 A. With respect to construction and mode of operation, reference is expressly made to this document.

The number of (in the exemplary embodiment shown twelve) gripper tongs 22 of the removal conveyor 18 are driven in a direction of circulation E, which is opposite the direction of circulation U of the processing device 12, along a self-enclosed movement path 64.

In a preferred manner, the gripper tongs are arranged distributed uniformly over the circumference of a carrier wheel 66 which is driven so as to rotate about a takeover axis 68, running parallel to the axis of rotation 14, in the direction of circulation E.

At this point, it should be noted that the gripper tongs 22 could also be arranged, set apart one after another, on a self-enclosed conveying member 70, for example a chain, which is guided at the end facing the processing device 10 around a deflection wheel corresponding to the carrier wheel 66.

The movement path 64 thus runs about the takeover axis 68 in an arc of a circle which forms a takeover portion and faces the processing device 12, each gripper tong 22 coinciding with a receiving element 32 and being moved into the receiving element 32 through the recess 60 and then out of the receiving element again.

On reaching the takeover portion 72, the gripper tongs are opened and directed obliquely forward and radially outward with respect to their direction of circulation E. They each comprise the printing product 24, which is arranged in the receiving element 32 in question and rests with its edge 30, for example the fold, against the floor 42, at the side rim 26 of the printing product opposing the edge 30, optionally at what is known as the bloom, with respect to the axis of rotation 14 from the radial exterior toward the radial interior. The gripper tongs 22 are closed, for example on reaching the point of the takeover portion 72 that is closest to the axis of rotation 14. In the trailing region of the takeover portion 72 in the direction of circulation E, the gripper tongs 22 are moved out of the receiving elements 32, the gripper tongs securing and entraining the respectively grasped printing product 24. At the same time, the gripper tongs 22 are pivoted toward the rear from their direction which is for example radial during closing, counter to their direction of circulation E, so that they are arranged at an angle of about 45° with respect to the movement path 64 on reaching the end of the takeover portion 72 that is positioned downstream. On reaching the end of the takeover portion 72, the gripper tongs 22 are opened to release the respective printing product 24.

In FIG. 1 the takeover axis 68 is set apart from the axis of rotation 14 of the processing device 12 in order to process small printing products 24. If, however, larger-sized printing products 24 are to be processed, the distance of which between the side rim 26 and the edge 30 is larger than in the small printing products 24, the takeover axis 68, and thus the takeover portion 72, is outwardly displaced in the radial direction with respect to the axis of rotation 14, such as is indicated by solid lines in FIG. 2; dot-dash lines indicate therein the position of the carrier wheel 66 during processing of small-sized printing products 24, as in FIG. 1. In the exemplary embodiment shown, the adaptation to the size of the printing products 24 is thus carried out by displacing the takeover axis 68, and thus the takeover portion 72, along a straight line 74 running at least approximately through the axis of rotation 14.

The clamp transporter 20 is arranged, viewed in the direction of circulation U of the processing device 12, downstream with respect to the removal conveyor 18. Its clamps 28 are driven along a self-enclosed clamp path in a discharge direction W which is in the same direction as the direction of circulation U and is in the opposite direction to the direction of circulation E of the removal conveyor 18.

In the exemplary embodiment shown, the clamps 28 are arranged, set apart one after another, on a further conveying member 78, for example a chain. The further conveying member 78 is channel or rail-guided in a known manner and deflected around a deflection wheel at the end of the clamp transporter 20 that faces the processing device 12. The clamp path 76 is thus shaped in the manner of an arc of a semicircle in its end region facing the cell wheel 10. Furthermore, it should be noted at this point that the distance between the axis of rotation 14 and the movement path of the clamps 28 corresponds roughly to the distance between the axis of rotation 14 and the movement path of the gripper tongs 22 when the takeover portion 72 is in a position for the processing of small-sized printing products 24. Furthermore, in the exemplary embodiment shown, connecting straight lines between the points, closest to the axis of rotation 14, of the movement path 64 of the gripper tongs 22 and the clamp path 76 enclose an angle of about 45° with the axis of rotation 14. Furthermore, it should be noted that the clamp transporter 20 is preferably arranged stationarily and is not displaced in its position for adaptation to the size to be processed of the printing products 24. Furthermore, it should be noted that the movement path 64 and the clamp path 76 run in a plane running at right angles to the axis of rotation 14 centrally to the recess 60.

Just as a gripper tong 20 coincides with each receiving element 32, a clamp 28 coincides with a gripper tong 22.

In a preferred manner, the removal conveyor 18 has a drive motor 80 which can be set via a control device so as to be synchronizable with the processing device 12 and in the phase position. For this purpose, on the one hand, the processing device 12 has a first sensor 82 for detecting the rotary movement of the cell wheel 10 and, on the other hand, the removal conveyor 18 has a second sensor 84 which detects the rotation of the carrier wheel 66. Likewise, the clamp transporter 20 can be driven by a further drive motor 80'. For synchronizing the clamp transporter 20 with the removal conveyor 18, the clamp transporter 20 has a third sensor 86 which detects the rotary movement of the deflection wheel.

In a preferred manner, the removal conveyor 18 and the clamp transporter 20 are driven in synchronization and in a fixed phase position relative to each other, irrespective of the size of the printing products 24 to be processed. It is therefore also conceivable to rigidly couple the removal conveyor and the clamp transporter and to drive them using a common drive motor.

In a preferred manner, the relative phase position can also be maintained between the cell wheel 10 and the removal conveyor 18, irrespective of the size of the printing products 24 to be processed. If appropriate, a slight alteration of the phase position can be displayed at different processing speeds, for example from 28,000 printing products 24 per hour.

A monitoring sensor 88 is arranged between the removal conveyor 18 and the clamp transporter 20 in order to ascertain whether the clamps 28 have taken over the printing products 24 from the gripper tongs 22. Furthermore, the processing device 12 has a presence sensor 90 which ascertains whether the removal conveyor 18 has erroneously not grasped a printing product 24 and discharged it from the receiving element 32 in question, so that the printing product remains in the receiving element 32. Each receiving element 32 can have associated with it a presence sensor 90 which is fastened to the walls 36, for example.

The embodiment shown in FIGS. 1 and 2 of the device according to the invention operates as follows:

As described hereinbefore, the gripper tongs 22 individually grasp the printing products 24 in the receiving element 32 at the side rim 26 in a portion of the circulation path 62 that runs as an arc of a circle about the axis of rotation 14. During the further rotation of the cell wheel 10 and the further movement in the takeover portion 72, the gripper tongs 22 move out of the receiving elements 32 and entrain the corresponding printing product 24. As the distance between the guide elements 50 and the axis of rotation 14 is greater than the distance of the gripper tongs 22 from the takeover axis 68, the printing products 24 are raised by the support members 58 outward in the radial direction, with respect to the axis 14, in that they slide along the support members 58. As a consequence of this raising, the free end region of the printing products 24 is introduced with the edge 30 into the respective mouth of an open clamp 28 which is pivoted for this purpose obliquely forward with respect to the clamp path 76 in the discharge direction W. The clamps are transferred to the closing position, shortly before the support member 58 in question runs off from the printing product 24 in question as a consequence of the rotation in the direction of circulation U. As soon as a clamp 28 has reached its closing position, the associated gripper tong 22 is immediately opened in order to release the printing product 24 in question which is discharged by the clamp transporter 20 for further processing.

For the sake of completeness, it should be noted that the discharge station 16 interacts with the cell wheel 10 with respect to the axis of rotation 14 in an arc of a circle extending over about 45° to 90°. Furthermore, this arc of a circle preferably runs in a region of the circulation path 62 running above a horizontal plane through the axis of rotation 14 and on that side of a vertical plane through the axis of rotation 14 in which the receiving elements 32 are moved with a vertical component from the bottom up.

Figure 3:
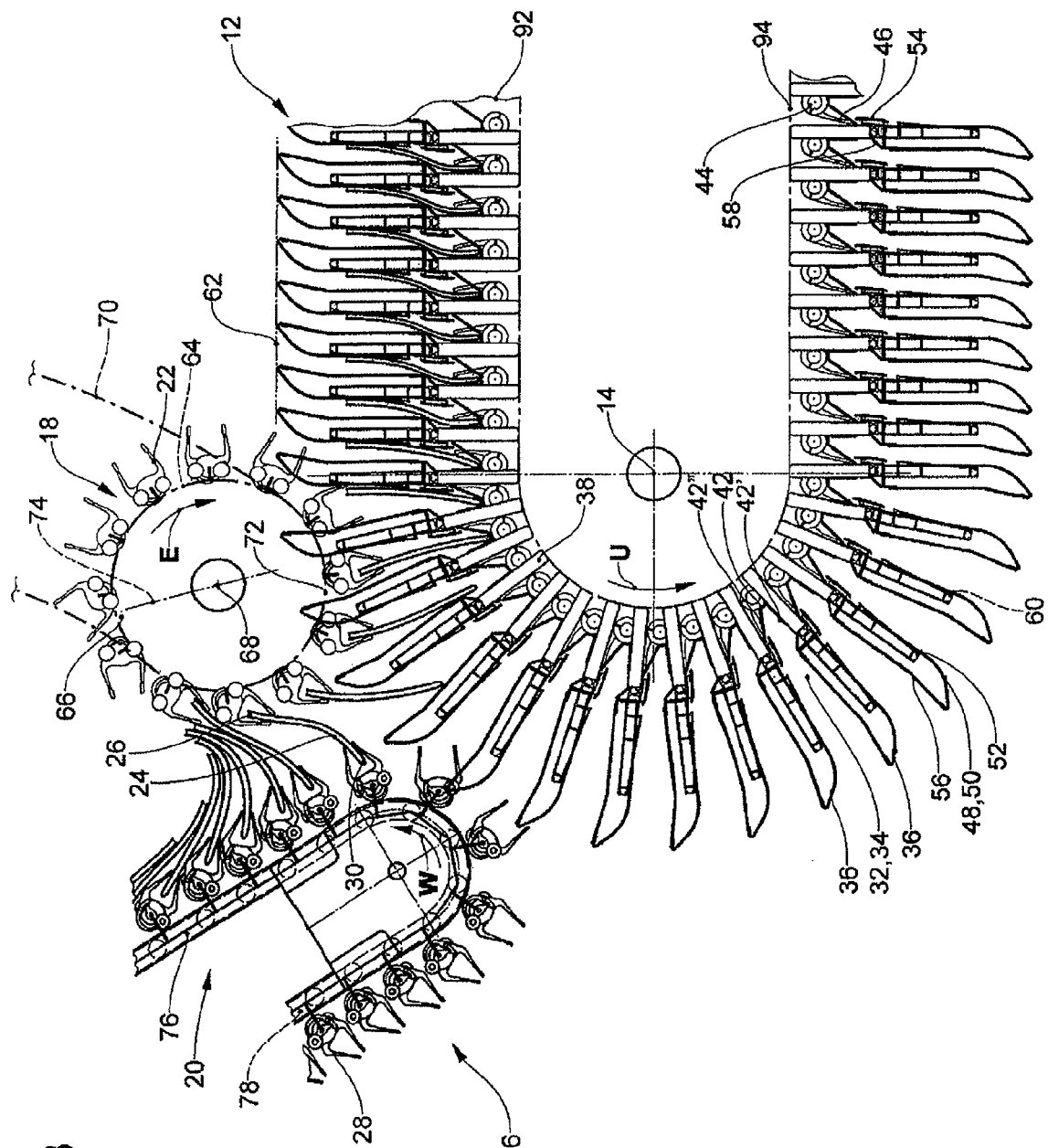
FIG. 3 is also a purely schematic view of a device according to the invention with a processing device embodied as a rotary device.

However, it is also possible to arrange the discharge station with respect to the aforementioned vertical plane on the other side, such as is shown in the exemplary embodiment shown in FIG. 3 with a processing device 12 embodied as a rotary device.

The rotary device has a large number of receiving elements 32 which likewise form pockets 34 and are designed in the same way as described above in relation to FIGS. 1 and 2. The walls 36 are fastened to a self-enclosed circulation member 94, for example chains which are each guided, for example by a deflection wheel, about a horizontal axis of rotation 14 at the end region, which is positioned upstream and, as shown in FIG. 3, downstream, of the processing device 12. The circulation path 62 of the receiving elements 32 thus runs rectilinearly toward the end of the processing device 12 that is positioned downstream and preferably in the horizontal direction and then in an arc of a circle, in this case in an arc of a semicircle, around the axis of rotation 14. At this point, it should be noted that, as a consequence of the arc of a circle, the pockets 34 or receiving elements 32 are opened further radially outwardly during running into the arc of a circle, as the walls 36 are transferred from their, in the upper, straight portion of the circulation path, parallel position at right angles to the circulation path to a position radial to the axis of rotation 14. Furthermore, in the same manner as in the embodiment of FIGS. 1 and 2, each wall 36 is provided with a support member 58 and a recess 60.

Furthermore, each receiving element 32 is equipped with a flute-like floor 42 and a clamping device 44, such as was described in relation to the embodiment according to FIGS. 1 and 2.

Viewed in the direction of circulation U, which in this case runs in the anticlockwise direction, there are arranged at the start of the arc of a circle of the circulation path 62 firstly the removal conveyor 18 and subsequently, downstream with respect to the removal conveyor, the clamp transporter 20. Both the removal conveyor 18 and the clamp transporter 20 are embodied in precisely the same manner as described above in relation to FIGS. 1 and 2, the directions of circulation E and W being adapted to the inverted direction of circulation U.

For adapting to the size to be processed of the printing products 24, the distance of the takeover portion 72, which runs concentrically about the takeover axis 68, from the axis of rotation 14 can be set in this case too, in that a displacement is carried out along the straight line 74 running at least approximately through the axis of rotation 14. The mode of operation and the interacting of the processing device 12, removal conveyor 18 and clamp transporter 20 are also carried out in precisely the same manner as described hereinbefore.

In the embodiment shown in FIG. 3, the printing products 24 in the receiving elements 32 are not displaced in a direction at right angles to the direction of circulation U. However, as is known from document CH 669 944, the embodiment shown in FIG. 3 can easily be embodied in such a way that the printing products 24 can be displaced accordingly in this case too.

For the sake of completeness, it should be noted that in all the embodiments shown the clamping fingers 46 of the clamping device 44 are pivoted from their clamping position to the release position for releasing the printing products 24 in question at the latest when a gripper tong 22 has grasped the printing product 24 in question.

Furthermore, it is conceivable to temporarily shut down or deactivate the clamp transporter 20 and to discharge the printing products 24 from the processing device 12 in a known manner by the removal conveyor 18. For this purpose, the removal conveyor 18 is preferably equipped with the conveying member 70. If folded printing products 24 are supplied to the removal conveyor 18 with their fold, forming the edge 30, in the receiving elements 32 resting against the floor 42, the printing products are in the present mode of operation discharged while being held at the bloom forming the side rim 26.

It should also be noted that a plurality of printing products 24 can be grasped and discharged simultaneously if they are supplied to the discharge station 16 while being arranged in the receiving elements 32 in a stack-like, inserted or assembled manner.

The invention claimed is:

1. A device for processing printing products comprising:
   a processing device having a large number of receiving elements which are driven along a circulation path in a direction of circulation and are arranged one after another and transversely to the circulation path, and
   a discharge station for grasping and discharging printing products, which are brought in the receiving elements up to the discharge station, in a portion of the circulation path that runs in an arc of a circle about an axis of rotation,
   wherein the discharge station has a removal conveyor with a number of gripper tongs which are driven so as to circulate along a self-enclosed movement path counter to the direction of circulation and are moved in a takeover portion, which runs in an arc of a circle around a takeover axis and faces with its radial outer side the processing device, the takeover axis being parallel to and set apart from the axis of rotation of the circulation path, into the receiving elements in synchronization therewith and, after the grasping of the printing products at a side rim, out of the receiving elements while moving along the arc of the circle, and
   wherein the discharge station has a clamp transporter which is arranged, viewed in the direction of circulation, downstream of the removal conveyor and has controlled clamps which are driven along a self-enclosed clamp path in the same direction as the direction of circulation and are capable of grasping the printing products, which are held by the gripper tongs at their edge opposing the side rim and of conveying them onward once released by the gripper tongs.

2. The device as claimed in claim 1, wherein the position of the takeover portion can be set, for adaptation to the size of the printing products, by displacing the takeover axis in a direction running at least approximately radially to the axis of rotation.

3. The device as claimed in claim 2, wherein the clamps are arranged, set apart one after another, on a conveying member which is driven in a circulating manner.

4. The device as claimed in claim 2, wherein the clamp transporter is stationary.

5. The device as claimed in claim 2, wherein the receiving elements are embodied in a pocket-like manner.

6. The device as claimed in claim 2, wherein the gripper tongs are arranged on a carrier wheel, which is driven so as to rotate about the takeover axis, and the movement path thus forms a circular path.

7. The device as claimed in claim 2, wherein the movement path of the gripper tongs and the clamp path run in a common plane running at right angles to the axis of rotation.

8. The device as claimed in claim 2, wherein the removal conveyor has a drive motor which can be set so as to be synchronizable with respect to the processing device and in the phase position.

9. The device as claimed in one of claim 2, wherein the removal conveyor and the clamp transporter are driven in synchronization and in a fixed phase position relative to each other.

10. The device as claimed in claim 2, wherein the processing device is embodied in a drum-like manner and the receiving elements circulate in a circular path about the axis of rotation.

11. The device as claimed in claim 2, wherein the clamp path runs in the manner of an arc of a circle in its end region facing the processing device.

12. The device as claimed in claim 2, characterized by a monitoring sensor for monitoring whether the clamps have taken over the printing products from the gripper tongs.

13. The device as claimed in claim 2, wherein the processing device has a presence sensor to ascertain whether the removal conveyor has discharged all the printing products from the receiving elements.

14. A device for processing printing products comprising:
   a processing device having a large number of receiving elements which are driven along a circulation path in a direction of circulation and are arranged one after another and transversely to the circulation path, and
   a discharge station for grasping and discharging printing products, which are brought in the receiving elements up to the discharge station, in a portion of the circulation path that runs in an arc of a circle about an axis of rotation,
   wherein the discharge station has a removal conveyor with a number of gripper tongs which are driven so as to circulate along a self-enclosed movement path counter to the direction of circulation and are moved in a takeover portion, which runs in an arc of a circle around a takeover axis parallel to and set apart from the axis of rotation of the circulation path, into the receiving elements in synchronization therewith and, after the grasping of the printing products at a side rim, out of the receiving elements, and
   wherein the discharge station has a clamp transporter which is arranged, viewed in the direction of circulation, downstream of the removal conveyor and has controlled clamps which are driven along a self-enclosed clamp path in the same direction as the direction of circulation and are capable of grasping the printing products, which are held by the gripper tongs at their edge opposing the side rim and of conveying them onward once released by the gripper tongs, wherein the position of the takeover portion can be set, for adaptation to the size of the printing products, by displacing the takeover axis in a direction running at least approximately radially to the axis of rotation, and wherein each receiving element has a, viewed in the direction of circulation, trailing wall with a radially external guide element for the printing products held by the gripper tongs in order to introduce the printing products into the opened clamps.

15. A device for processing printing products comprising:

a processing device having a large number of receiving elements which are driven along a circulation path in a direction of circulation and are arranged one after another and transversely to the circulation path, and a discharge station for grasping and discharging printing products, which are brought in the receiving elements up to the discharge station, in a portion of the circulation path that runs in an arc of a circle about an axis of rotation, wherein the discharge station has a removal conveyor with a number of gripper tongs which are driven so as to circulate along a self-enclosed movement path counter to the direction of circulation and are moved in a takeover portion, which runs in an arc of a circle around a takeover axis parallel to and set apart from the axis of rotation of the circulation path, into the receiving elements in synchronization therewith and, after the grasping of the printing products at a side rim, out of the receiving elements, and wherein the discharge station has a clamp transporter which is arranged, viewed in the direction of circulation, downstream of the removal conveyor and has controlled clamps which are driven along a self-enclosed clamp path in the same direction as the direction of circulation and are capable of grasping the printing products, which are held by the gripper tongs at their edge opposing the side rim and of conveying them onward once released by the gripper tongs, wherein the position of the takeover portion can be set, for adaptation to the size of the printing products, by displacing the takeover axis in a direction running at least approximately radially to the axis of rotation, and wherein the receiving elements have a recess which is outwardly open in the radial direction and through which the gripper tongs and the clamps are moved.

16. A method for processing printing products comprising the steps of:

bringing the printing products up to a discharge station, by a processing device having a large number of receiving elements which are driven along a circulation path in the direction of circulation and are arranged one after another and transversely to the circulation path; and grasping and discharging the printing products, which are brought in the receiving elements up to the discharge station in a portion of the circulation path that runs in an arc of a circle about an axis of rotation by the discharge station;

wherein the printing products are grasped at a side rim by a removal conveyor of the discharge station having a number of gripper tongs which are driven so as to circulate along a self-enclosed movement path counter to the direction of circulation and are moved in a takeover portion, which runs in an arc of a circle around a takeover axis and faces with its radial outer side the processing device, the takeover axis being parallel to and set apart from the axis of rotation of the circulation path, into the receiving elements in synchronization therewith and, after the grasping of the printing products at the side rim, out of the receiving elements while moving along the arc of the circle, and wherein the printing products, which are held by the gripper tongs, are grasped at their edge opposing the side rim and conveyed onward once released by the gripper tongs by a clamp transporter of the discharge station which is arranged, viewed in the direction of circulation, downstream of the removal conveyor and has controlled clamps which are driven along a self-enclosed clamp path in the same direction as the direction of circulation and are capable of grasping the printing products, which are held by the gripper tongs at their edge opposing the side rim and of conveying them onward once released by the gripper tongs.

17. A method for processing printing products comprising the steps of:

bringing the printing products up to a discharge station, by a processing device having a large number of receiving elements which are driven along a circulation path in the direction of circulation and are arranged one after another and transversely to the circulation path; and grasping and discharging the printing products, which are brought in the receiving elements up to the discharge station in a portion of the circulation path that runs in an arc of a circle about an axis of rotation by the discharge station;

wherein the printing products are grasped at a side rim by a removal conveyor of the discharge station having a number of gripper tongs which are driven so as to circulate along a self-enclosed movement path counter to the direction of circulation and are moved in a takeover portion, which runs in an arc of a circle around a takeover axis parallel to and set apart from the axis of rotation of the circulation path, into the receiving elements in synchronization therewith and, after the grasping of the printing products at the side rim, out of the receiving elements, and wherein the printing products, which are held by the gripper tongs, are grasped at their edge opposing the side rim and conveyed onward once released by the gripper tongs by a clamp transporter of the discharge station which is arranged, viewed in the direction of circulation, downstream of the removal conveyor and has controlled clamps which are driven along a self-enclosed clamp path in the same direction as the direction of circulation and are capable of grasping the printing products, which are held by the gripper tongs at their edge opposing the side rim and of conveying them onward once released by the gripper tongs, wherein printing products are discharged from the processing device by the removal conveyor as a consequence of deactivation of the clamp transporter.

18. A method for processing printing products comprising the steps of:

bringing the printing products up to a discharge station, by a processing device having a large number of receiving elements which are driven along a circulation path in the direction of circulation and are arranged one after another and transversely to the circulation path; and grasping and discharging the printing products, which are brought in the receiving elements up to the discharge station in a portion of the circulation path that runs in an arc of a circle about an axis of rotation by the discharge station;

wherein the printing products are grasped at a side rim by a removal conveyor of the discharge station having a number of gripper tongs which are driven so as to circulate along a self-enclosed movement path counter to the direction of circulation and are moved in a takeover portion, which runs in an arc of a circle around a takeover axis which is parallel to and set apart from the axis of rotation of the circulation path, into the receiving elements in synchronization therewith and, after the grasping of the printing products at the side rim, out of the receiving elements while moving along the arc of the circle, and wherein the printing products, which are held by the gripper tongs, are grasped at their edge opposing the side rim and conveyed onward once released by the gripper tongs by a clamp transporter of the discharge station which is arranged, viewed in the direction of circulation, downstream of the removal conveyor and has controlled clamps which are driven along a self-enclosed clamp path in the same direction as the direction of circulation and are capable of grasping the printing products, which are held by the gripper tongs at their edge opposing the side rim and of conveying them onward once released by the gripper tongs;

wherein the position of the takeover portion is set, for adaptation to the size of the printing products, by displacing the takeover axis in a direction running at least approximately radially to the axis of rotation.

\* \* \* \* \*

UNITED STATES PATENT AND TRADEMARK OFFICE
CERTIFICATE OF CORRECTION

PATENT NO. : 8,777,221 B2  
APPLICATION NO. : 12/792522  
DATED : July 15, 2014  
INVENTOR(S) : Stauber et al.

Page 1 of 1

It is certified that error appears in the above-identified patent and that said Letters Patent is hereby corrected as shown below:

Title page
Item (73) Assignee: "Ferag AB" should read --Ferag AG--.

Signed and Sealed this
Second Day of December, 2014

Michelle K. Lee
*Deputy Director of the United States Patent and Trademark Office*